United States Patent [19]

Hornig et al.

[11] 3,876,577
[45] Apr. 8, 1975

[54] HEAT-SENSITISED LATICES

[75] Inventors: Heinz Hornig, Cologne, Germany; Edmund Hüther, Rio de Janeiro, Brazil; Ernst Schwinum, Leichlingen; Gustav Sinn, Opladen, both of Germany

[73] Assignee: Bayer Aktiengesellschaft, Leverkusen, Germany

[22] Filed: June 26, 1973

[21] Appl. No.: 373,762

[30] Foreign Application Priority Data

July 3, 1972  Germany............................ 2232526

[52] U.S. Cl. ........ 260/29.7 T; 260/3; 260/29.7 AT; 260/29.7 SE; 260/34.2; 260/78.5 T; 260/80 M; 260/95 R; 260/96 R
[51] Int. Cl. ............................ C08d 7/16; C08d 1/9
[58] Field of Search.... 260/29.7 T, 29.6 R, 29.7 SE, 260/29.7 AT, 95 R, 34.2, 96 R, 78.5 T, 3

[56] References Cited
UNITED STATES PATENTS

| | | | |
|---|---|---|---|
| 3,344,103 | 9/1967 | Eilbeck et al. | 260/29.7 T |
| 3,377,307 | 4/1968 | Kolb et al. | 260/29.7 T |
| 3,484,394 | 12/1969 | Holdstock | 260/29.6 X |
| 3,546,154 | 12/1970 | Hwa et al. | 260/29.6 R |
| 3,574,159 | 4/1971 | Fetter et al. | 260/29.7 T |
| 3,702,315 | 11/1972 | Knechtges et al. | 260/29.7 T |
| 3,706,697 | 12/1972 | Backderf | 260/29.7 T |
| 3,714,101 | 1/1973 | Knechtges et al. | 260/29.7 T |

OTHER PUBLICATIONS

Blackley, High Polymer Latices, Vol. 1, pp. 35–44 (Palmerton, N.Y., 1966). Lib. Congr. TS1890.B54.

*Primary Examiner*—Melvin Goldstein
*Assistant Examiner*—T. DeBenedictis, Sr.
*Attorney, Agent, or Firm*—Connolly and Hutz

[57]  ABSTRACT

A process for the preparation of heat-sensitive latices, characterised in that a mixture of 45–80 % by weight of butadiene, 10–45 % by weight of acrylonitrile, 0–20 % by weight of styrene, 0.5–10 % by weight of (meth)acrylic acid, 2–10 % by weight of (meth)acrylamide and 0–5 % by weight of (meth)acrylamido-N-methylolmethyl ether is polymerised on radical initiators in an aqueous emulsion in the presence of 1–10 % by weight of an emulsifier or a mixture of several emulsifiers, only a small proportion of the total quantity of emulsifier being present at the beginning of polymerisation, the remainder being added in the course of polymerisation.

5 Claims, No Drawings

HEAT-SENSITISED LATICES

This invention relates to a process for the preparation of heat-sensitised latex mixtures and to the use of these mixtures for the production of bonded fibre fleeces.

It is known that fibre fleeces can be bonded using aqueous dispersions of copolymers which have been obtained mainly from butadiene, acrylonitrile and/or styrene. It has also been disclosed in German Pat. Nos. 1,234,394; 1,268,828 and 1,494,037 and U.S. Pat. No. 3,484,394 that fleeces can be impregnated with latices which have been rendered heat-sensitive by additives.

It has been found, however, that fleeces impregnated in this way often are not entirely satisfactory. Thus the fleeces either have an insufficient resistance to solvents or they easily swell in plasticisers or bonding of the fleece is non-uniform.

A process for the preparation of heat-sensitive latices has now been found, which are excellent binders for fleeces. This process comprises polymerising a mixture of 45–80 % by weight of butadiene, 10–45 % by weight of acrylonitrile, 0–20 % by weight of styrene, 0.5–10 % by weight of (meth)acrylic acid, 2–10 % by weight of (meth)acrylamide and 0–5 % by weight of (meth)acrylamido-N-methylolmethylether in the presence of radical initiators in an aqueous emulsion in the presence of 1–10 % by weight of an emulsifier or a mixture of several emulsifiers, only small proportion of the total quantity of emulsifier being present at the beginning of polymerisation, the remainder being added in the course of polymerisation at such a rate that when U % of the monomers have been polymerised, X % of the total quantity of emulsifier is present in the reaction mixture, where

| X = | when | U = |
|---|---|---|
| 5 – 35 | | 20 |
| 20 – 65 | | 40 |
| 50 – 80 | | 60 |
| 70 – 100 | | 80 |
| 100 | | 93 | and adding 0.05 to 10 % by weight of a heat-sensitising agent to the resulting latex.

Suitable radical initiators for the process are, for example, organic peroxide compounds. The initiators are generally added in quantities of 0.01 to 2.0 % by weight, based on the monomer mixture.

The quantity of water used for emulsifying the monomers is generally 50 to 400 parts by weight, per 100 parts by weight of monomer mixture.

The emulsifiers used may be any of the non-ionic or anionic emulsifiers commonly used for emulsion polymerisations or a combination of such emulsifiers. The total quantity of emulsifiers used is preferably 1–10 % by weight, based on the monomer mixture. It is particularly advantageous to use an emulsifier combination of (1) a water-soluble alkali metal sulphonate or sulphate of a $C_{12}$–$C_{18}$ hydrocarbon or an alkylated aromatic compound and (2) a non-ionic emulsifier. The weight proportion in which emulsifiers (1) and (2) are mixed is preferably from 1:10 to 10:1.

Two method of polymerisation are described below.

1. Most of the water, 10–30 % of the total emulsifier and all of the monomer mixture are introduced into a reaction vessel and the mixture is activated and polymerised up to 20 to 50 % by weight monomer conversion. The remainder of the emulsifier is added stepwise or continuously at such a rate that a U % by weight conversion, the mixture contains X % by weight of the total emulsifier:

| U (% by weight conversion) | X (% by weight of total emulsifier) |
|---|---|
| 20 | 10 – 35 |
| 40 | 20 – 55 |
| 60 | 50 – 80 |
| 80 | 70 – 100 |
| 93 | 100 |

2. Most of the water, 5–15 % by weight of the total emulsifier and 0–20 % by weight of the total monomers are introduced into a reaction vessel, the mixture is activated and the remaining 80–100 % by weight of the monomers are then run in continuously and the remainder of the emulsifier is added continuously or stepwise as an aqueous solution at such a rate that u % by weight conversion the mixture contains X % by weight of the total emulsifier:

| U (% by weight conversion) | X (% by weight of total emulsifier) |
|---|---|
| 20 | 5 – 35 |
| 40 | 25 – 65 |
| 60 | 50 – 80 |
| 80 | 70 – 100 |
| 93 | 100 |

By this process, very stable non-separating latices having a solids content of 30–60 % by weight are obtained from the monomer mixtures described in more detail below which are basically difficult to copolymerise.

Emulsion polymerisation of the monomers in question is known in principle. It is normally carried out at temperatures of 10°–80°C. Besides the initiators, usual molecular weight regulating agents may also be added.

The copolymer dispersions used for fleece-bonding may contain additives, incorporated either before or during processing to achieve special effects. Thus, acid-yielding compounds added together with the heat-sensitising agent lower the coagulation temperature while non-ionic emulsifiers such as ethoxylated alkyl phenols or o-benzyl phenols generally raise the coagulation temperature. Other suitable additives are dyes, pigments, fillers, thickners, electrolytes, anti-age resistors, water-soluble resins, vulcanisation chemicals among others.

After preparation of the latices according to the invention, they are heat-sensitised by the addition of 0.5–10 % by weight, based on the polymer, of heat-sensitising agents. Suitable heat-sensitising agents are, among others, the organopolysiloxanes described in German Auslegeschrift No. 1,268,828, German Offenlegungsschrift No. 1,494,037 and U.S. Pat. No. 3,484,394.

Such organopolysiloxanes are inter alia Si-functional siloxane composed of units (A) and siloxane units (B), which have alkoxy bonded directly to silicon, units (A) being $[(CH_3)_3SiO_{1/2}]$; $[(CH_3)SiO_{3/2}]$; $[C_6H_5SiO_{3/2}]$; $[(CH_3)_2SiO]$; $[(C_6H_5)_2SiO]$, units (B) being inter alia $[RO(R')_2SiO_{1/2}]$; $[(RO)_2R'SoO_{1/2}]$; $[RO(R')SiO]$. (R = methyl, ethyl, propyl, butyl $+C_nH_{2n}O+_m$ H; $+C_nH_{2-nO}+_m$ R, $n = 2$–6, $m = 1$–150, R' = methyl, phenyl. Examples are: $[(C_2H_5O)_2SiC_6H_5]_2O$; $C_2H_5O$-$[(CH_3)Si(OC_2H_5)O]_5C_2H_5$; $[CH_3SiO_3][(CH_3)_2SiO]_{20}([C_2H_4O]_{4.3}[C_3H_6O]_3C_4H_9)_3$ $CH_3$—$CH_2$—$C(CH_2O)_3([(CH_3)_2SiO]_{10}[C_2H_4O]_9[C_3H_6O]_3CH_3)_3$ Another type of siloxanes are C-functional siloxanes which are composed of units (A) as above and units (C) which have alkoxy or amino bonded to silicon via carbon. Examples of compounds (C) being [X—R—O-$(CH_2)_n$ Si$(CH_3)_2O_{1/2}$] and [X—R—O $(CH_2)_n$ Si(CH$_3$)O] wherein X is H, OH, OR' (R' being defined as R above and R is alkylene or polyoxyalkylene.

Still another type is an organopolysiloxane of two units $(R_1)_nSiO_{4-n}$ and 1–20 units $(R_2)_m$— Si$[R_2X]O_{4-m-1/2}$ $$X \text{ being } - \underset{\underset{OR_4}{|}}{CH} - \underset{\underset{R_3}{|}}{CH_2}$$

$R_1$ being H, alkyl aryl, $R_2$ being alkylene, $R_3$ = polyether radical, $R_4 = R_1$ or acyl, $m = 1$ or 2, $n = 1, 2$ or 3.

Polyvinylmethylethers, polyglycolethers, polyetherthioethers and/or polycarboxylic acids are also suitable.

The fibre fleeces which can be bonded with the latices prepared according to the invention are inter alia fleeces of synthetic or natrual fibres, for example cotton, wool, rayon staple, polyamide, polyester or polyacrylonitrile fibres, glass fibres, asbestos fibres, rock fibres or metal threads. The fleeces may also contain mixtures of several of the above mentioned fibres.

The heat-sensitised latex mixture is preferably incorporated into the fleece by steeping the fleece in an impregnating bath and squeezing out the excess latex. The steeped fleece is then heated in a subsequent procedure, e.g. by exposure to an infrared source, hot air or high-frequency heat. At the predetermined coagualtion temperature the latex mixture coagulates rapidly and completely.

The heat-sensitised latex mixture may alternatively be introduced into the fleece by padding on one or both sides, by imprinting or spraying. The bonded fleece does not "split", i.e. fall apart into two thin sheets, splitting often occurs especially on drying thick fleeces which have been bonded with non-heat-sensitised mixtures due to migration of the latex particles to the heated fleece surfaces. Organopolysiloxanes are the preferred heat-sensitising agents.

In order to test fleece quality, 10 × 10 cm samples of the bonded fleece are stitched at the top surface to a black fabric. A sample prepared in this way is then placed into a 1-litre bottle which contains 400 cc of trichloroethylene. The bottle is then mechanically shaken (240 revs per min, amplitude 140 mm) for 30 minutes. The samples are then examined to assess the condition of the edges and the state of dissolution.

Resistance to plasticiser was assessed by swelling polymer films in dioctyl phthalate as follows: Mixtures of latices are prepared which
a. contain no vulcanising agent (zinc oxide, sulphur and accelerator),
b. contain only zinc oxide,
c. contain sulphur, zinc oxide and accelerators as vulcanising agents.

Films of 1 mm thickness are prepared from these mixtures and heated to 120°C for 30 minutes. Samples 20 × 20 × 1 mm are cut from these films and stored in dioctyl phthalate (DOP) at 20°C for up to 7 days. The degree of swelling is determined from the weight increase of the samples in accordance with the following equation:

Swelling in % =

$$\frac{\text{weight after storage in DOP} - \text{weight before storage in DOP}}{\text{weight before storage in DOP}} \text{ multiplied by 100}$$

The following examples serve to illustrate what has been described above and demonstrate the superiority of the heat-sensitised latex mixtures according to the invention and of the bonded fibre fleeces.

EMULSION POLYMERS EXAMINED

| | Bu | An | St | AAc | MAAc | MAAm | ME | % solid |
|---|---|---|---|---|---|---|---|---|
| Latex 1 | 54 | 39 | — | — | 3 | 4 | — | 40 |
| Latex 2 | 50 | 31 | 10 | — | 2 | 5 | 2 | 40 |
| Latex 3 | 62 | 30 | — | 2 | — | 6 | — | 45 |
| Comparison latex A | 60 | 35 | — | — | 5 | — | — | 46 |
| Comparison latex B | 60 | — | 33 | — | 4 | 3 | — | 50 |

The figures indicate parts by weight of the given monomer, based on 100 parts by weight of all the monomers. The symbols have the following meanings: Bu = butadiene, An = acrylonitrile, St = styrene, AAc = acrylic acid, MAAc = methacrylic acid, MAAm = methacrylamide, ME = methacrylamido-N-methylolmethylether, % solid = percent by weight of solid in 100 parts of latex.

RESISTANCE TO PLASTICIZER

The tests were carried out as described above by swelling the films in dioctyl phthalate (DOP). It will be seen from the table below that films based on latices one to three are superior to those prepared from comparison latices A and B even when no vulcanising agent has been added to latices one to three.

The following mixtures were used:
a. latex without additive,
b. 2.5 parts by weight of zinc oxide (in dispersion) were added to the latex, based on 100 parts by weight of polymer;
c. 2.5 parts by weight of zinc oxide, 1.5 parts by weight of sulphur and 0.8 parts by weight of zinc dimethyldithiocarbamate (using dispersions in each case) were added to the latex, based on 100 parts by weight of polymer.

SWELLING IN DIOCTYL PHTHALATE (%)

| | Swelling time | a) without vulcanising paste | b) with ZnO | c) with vulcanising paste (S, ZnO) |
|---|---|---|---|---|
| Latex 1 | 1 day | 1.6 | 1.2 | 0.3 |
| | 7 days | 3.4 | 2.3 | 0.5 |
| Latex 2 | 1 day | 8.0 | 6.9 | 4.0 |
| | 7 days | 10.6 | 8.3 | 6.1 |
| Latex 3 | 1 day | 2.1 | 2.0 | 1.2 |
| | 7 days | 4.5 | 4.5 | 2.4 |

SWELLING IN DIOCTYL PHTHALATE (%)
-Continued

| Swelling time | | a) without vulcanising paste | b) with ZnO | c) with vulcanising paste (S, ZnO) |
|---|---|---|---|---|
| Latex A | 1 day | 17.7 | 14.2 | 8.8 |
|  | 7 days | 54.2 | 35.5 | 26.2 |
| Latex B | 1 day | 30.5 | 28.1 | 20.4 |
|  | 7 days | 69.8 | 62.2 | 51.6 |

RESISTANCE TO CLEANING

Thin fleeces composed of 20% of rayon staple and 80% of synthetic fibres were impregnated with the latex mixtures which had been used for preparing the films used for the swelling test in DOP. The quantity of latex mixtures with which the fleeces were impregnated corresponded to about 20 parts by weight of dried latex mixture to 100 parts by weight of fibres. Fibre fleeces treated in this way were dried at about 70°C for 20 minutes, heated to 135°C for 10 minutes and then tested for their resistance to cleaning in trichloroethylene by the method previously described.

This test also shows the superiority of fibre fleeces impregnated with latices one to three over fleeces bonded with comparison latices A and B even when no vulcanising chemicals are added to latices one to three.

Condition of the fleece after it has been shaken in trichloroethylene

| Fleece bonded with | a) without vulcanising agent | b) with the addition of zinc oxide | c) with the addition of ZnO, sulphur * |
|---|---|---|---|
| Latex 1 | intact sharp edges | intact sharp edges | intact sharp edges |
| Latex 1 | intact slightly frayed edges | intact slightly frayed edges | intact sharp edges |
| Latex 3 | intact slightly frayed edges | intact slightly frayed edges | intact sharp edges |
| Latex A | destroyed completely frayed edges | almost destroyed severely frayed edges | slightly attacked slightly frayed edges |
| Latex B | destroyed completely frayed edges | destroyed completely frayed edges | almost destroyed severely frayed edges |

* and vulcanising accelerator

HEAT SENSITISATION

The mixtures described below were prepared by introducing the additives into the latices and the heat coagulation temperature was determined by heating the mixtures in a boiling water bath. The test was repeated on five successive days.

Mixtures 1a (2a, 3a)

| 100.0 | parts by weight of | latex 1 (2, 3) |
| 1.75 | parts by weight of | non-ionic emulsifier |
| 2.0 | parts by weight of | organopolysiloxane |
| 2.5 | parts by weight of | zinc oxide (dispersed) |
| 1.5 | parts by weight of | sulphur (dispersed) |
| 0.8 | parts by weight of | zinc dimethyl dithiocarbamate (dispersed) |
| 5.0 | parts by weight of | titanium dioxide (dispersed) |

Mixtures 1b (2b, 3b)

The same as mixtures 1a (2a, 3a) but more highly diluted with water; 100.0 parts by weight of water were added to 1a and 2a and 120.0 parts by weight of water were added to 3a.

Mixtures 1c (2c, 3c)

The same as mixtures 1b (2b, 3b) but no non-ionic emulsifier was added.

Mixtures 1d (2d, 3d)

The same as mixtures 1b (2b, 3b) but no non-ionic emulsifier and no organopolysiloxane was added to the latices.

The observations made during the coagulation test are summarised in the following table.

| Mixture | Coagulation temperature °C 1st day | Other observations |
|---|---|---|
| 1a | 38 | Coagulation temperature constant over the whole measuring time; serum slightly cloudy |
| 2a | 39 | |
| 3a | 36 | |
| 1b | 40 | Coagulation temperature constant over the whole measuring time, clear serum |
| 2b | 42 | |
| 3b | 39 | |
| 1c | 38 | Coagulation temp. slowly falls |
| 2c | 36 | coagulated at room temperature on the 4th day |
| 3c | 36 | coagulated at room temperature on the 3rd day |
| 1d | no coagulation | — |
| 2d | | |
| 3d | | |

We claim:

1. A process for preparing a heat sensitive latex which comprises polymerizing a mixture of 45 to 80% by weight of butadiene, 10 to 45% by weight of acrylonitrile, 0 to 20% by weight of styrene, 0.5 to 10% by weight of acrylic acid, methacrylic acid or a mixture thereof, 2 to 10% by weight of acrylamide, methacrylamide or a mixture thereof and 0 to 5% by weight of methacrylamido-N-methylol methyl ether, acrylamido-N-methylol methyl ether or a mixture thereof in an aqueous emulsion in the presence of a free radical initiator and at least one emulsifier in an amount of 1 to 10% by weight, based on the monomer mixture, only a minor proportion of the total quantity of emulsifier employed being present at the beginning of polymerization and the remainder of the emulsifier being added during the course of polymerization at such a rate when U% by weight of the monomers have been polymerized, X% by weight of the total quantity of emulsifiers being present in the reaction mixture according to the arrangement wherein

| X is | when | U reaches |
|---|---|---|
| 5 to 35 | | 20 |
| 20 to 65 | | 40 |
| 50 to 80 | | 60 |
| 70 to 100 | | 80 |
| 100 | | 93 | and, after polymerization is complete, adding a heat sensitizing agent to the latex.

2. A process as claimed in claim 1 in which a single emulsifier is used.

3. A process as claimed in claim 1 in which a mixture of two or more emulsifiers is used.

4. A process as claimed in claim 1 in which 0.05 to 10% by weight of heat-sensitising agent is added.

5. A process as claimed in claim 1 in which the heat-sensitising agent used is an organopolysiloxane.

* * * * *